US012633586B2

(12) United States Patent
Liu et al.

(10) Patent No.: US 12,633,586 B2
(45) Date of Patent: May 19, 2026

(54) COMPREHENSIVE RECYCLING METHOD FOR WASTE LITHIUM IRON PHOSPHATE BATTERY

(71) Applicant: HUNAN JIN YUAN NEW MATERIALS JOINT STOCK COMPANY LIMITED, Yiyang (CN)

(72) Inventors: Xunbing Liu, Yiyang (CN); Jianjun Ouyang, Yiyang (CN); Chaowen Zhang, Yiyang (CN); Zi Wang, Yiyang (CN); Quncheng Zhou, Yiyang (CN); Zan Chen, Yiyang (CN); Shanmu Wu, Yiyang (CN); Xiongwu Dong, Yiyang (CN); Chang Liu, Yiyang (CN)

(73) Assignee: HUNAN JIN YUAN NEW MATERIALS JOINT STOCK COMPANY LIMITED, Yiyang (CN)

( * ) Notice: Subject to any disclaimer, the term of this patent is extended or adjusted under 35 U.S.C. 154(b) by 671 days.

(21) Appl. No.: 17/970,431

(22) Filed: Oct. 20, 2022

(65) Prior Publication Data

US 2023/0050044 A1 Feb. 16, 2023

Related U.S. Application Data

(63) Continuation of application No. PCT/CN2021/122292, filed on Sep. 30, 2021.

(30) Foreign Application Priority Data

Nov. 23, 2020 (CN) .......................... 202011326398.X

(51) Int. Cl.
H01M 10/54 (2006.01)
C01B 25/37 (2006.01)
(Continued)

(52) U.S. Cl.
CPC ........... H01M 10/54 (2013.01); C01B 25/375 (2013.01); C01D 15/08 (2013.01); C22B 3/10 (2013.01);
(Continued)

(58) Field of Classification Search
CPC .... H01M 10/54; H01M 4/58; H01M 2220/20; C01B 25/375; C01D 15/08; C22B 3/10; C22B 26/12; C22B 3/22
See application file for complete search history.

(56) References Cited

U.S. PATENT DOCUMENTS

2019/0161357 A1* 5/2019 Liu ........................... C22B 3/44

FOREIGN PATENT DOCUMENTS

CN 107739830 A * 2/2018 ............ H01M 10/54
CN 107777711 A 3/2018
(Continued)

OTHER PUBLICATIONS

CN-109554545-MT (Year: 2019).*
CN-111646447-MT (Year: 2020).*
CN 107739830 MT (Year: 2018).*
(Continued)

*Primary Examiner* — Alexander Usyatinsky

(57) ABSTRACT

A comprehensive recycling method for a waste lithium iron phosphate battery relates to a waste lithium ion battery recycling technology, and particularly comprises: first selectively extracting lithium, and then using a lithium extraction residue to prepare iron phosphate, the using the lithium extraction residue to prepare the iron phosphate comprising: adding the lithium extraction residue to water to form a slurry, adding hydrochloric acid and stirring to react, so that iron is completely dissolved, performing solid-liquid separation, on the basis of iron and phosphorus contents of the obtained liquid, adding trisodium phosphate or ferric chloride, and then adding a sodium hydroxide solution to precipitate crude iron phosphate; and then performing reverse
(Continued)

three-stage washing to remove impurities to obtain a battery iron phosphate product. The problem of environmental protection is solved and meanwhile, all of the valuable elements are recycled, and a relative cost is greatly reduced by about 25%.

3 Claims, 1 Drawing Sheet

(51) Int. Cl.

| | | |
|---|---|---|
| *C01D 15/08* | (2006.01) | |
| *C22B 3/10* | (2006.01) | |
| *C22B 26/12* | (2006.01) | |
| *H01M 4/58* | (2010.01) | |
| *C22B 3/22* | (2006.01) | |

(52) U.S. Cl.
CPC ................ *C22B 26/12* (2013.01); *H01M 4/58* (2013.01); *C22B 3/22* (2013.01); *H01M 2220/20* (2013.01)

(56) References Cited

FOREIGN PATENT DOCUMENTS

| | | | | | |
|---|---|---|---|---|---|
| CN | 109554545 A | * | 4/2019 | ............ | H01M 10/54 |
| CN | 110683528 A | | 1/2020 | | |
| CN | 111646447 A | * | 9/2020 | ............ | H01M 10/54 |
| CN | 111653846 A | | 9/2020 | | |
| CN | 111675203 A | | 9/2020 | | |
| CN | 112320781 A | | 2/2021 | | |
| CN | 112357898 A | | 2/2021 | | |
| CN | 112357899 A | | 2/2021 | | |
| CN | 112410556 A | | 2/2021 | | |
| JP | 2016172654 A | | 9/2016 | | |

OTHER PUBLICATIONS

The decision of KPO to grant a Patent for Application KR 20237004009 (Year: 2025).*
The decision of JPO to grant a Patent for Application JP.2022563336 (Year: 2023).*
Internation Search Report of PCT/CN2021/122292, Mailed Jan. 5, 2022.

* cited by examiner

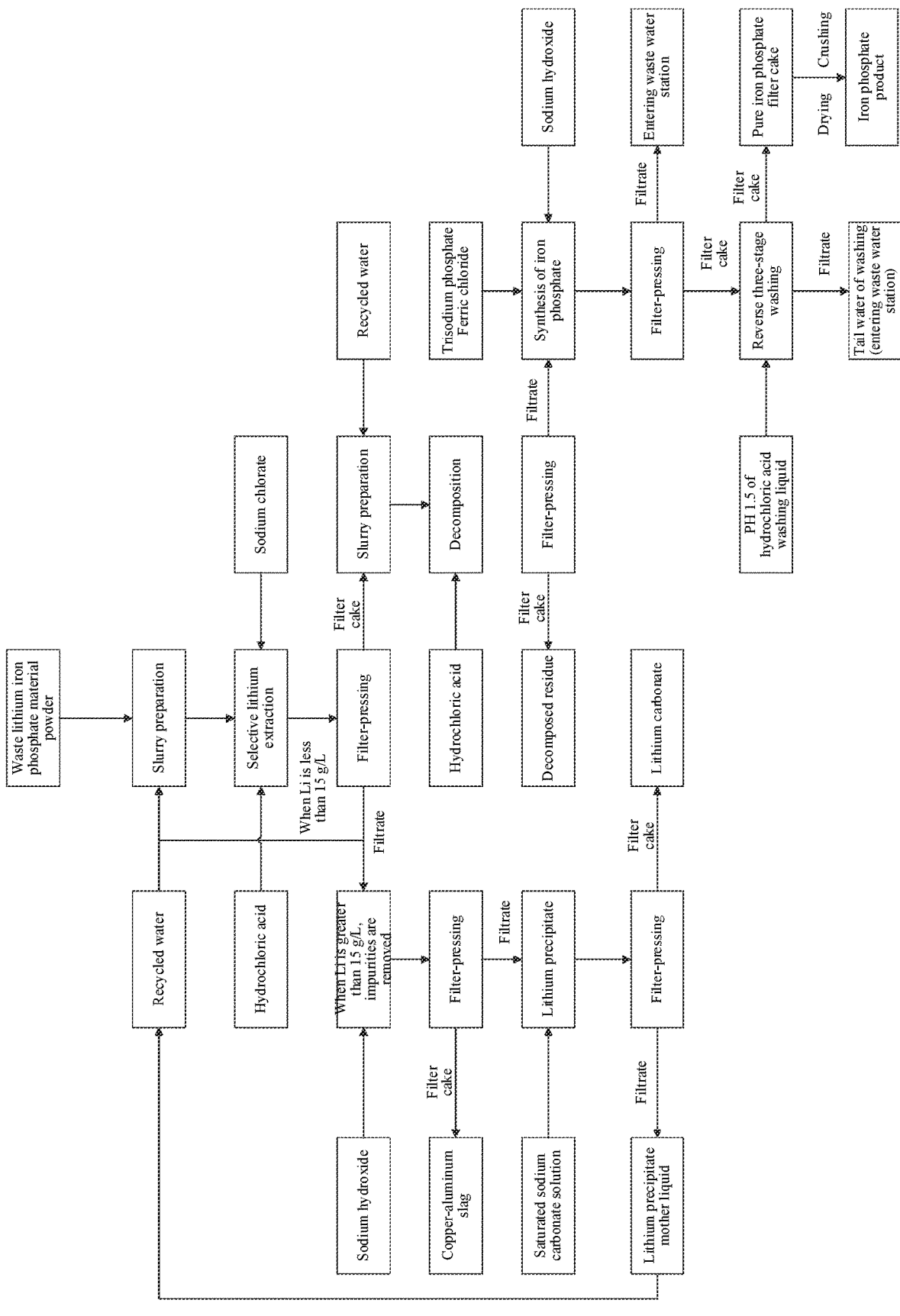

COMPREHENSIVE RECYCLING METHOD FOR WASTE LITHIUM IRON PHOSPHATE BATTERY

CROSS-REFERENCE TO RELATED APPLICATIONS

This application is a continuation of International Patent Application No. PCT/CN2021/122292 with a filing date of Sep. 30, 2021, designating the United States, now pending, and further claims priority to Chinese Patent Application No. 202011326398. X with a filing date of Nov. 23, 2020. The content of the aforementioned applications, including any intervening amendments thereto, are incorporated herein by reference.

TECHNICAL FIELD

The present invention relates to the field of waste lithium ion battery recycling technologies, and particularly to a comprehensive recycling method for a waste lithium iron phosphate battery.

BACKGROUND

Lithium iron phosphate battery is an excellent-capacity battery, and has become the first choice of new energy electric vehicles. With the rapid development of new energy automobile industry, the demand of lithium iron phosphate battery will be increased at a high speed, while the recycling of waste lithium iron phosphate battery also has become an important problem. Since a high-value lithium element content of the waste lithium iron phosphate battery is extremely low, while very-low-value iron and phosphorus element contents of the waste lithium iron phosphate battery are very high, and an existing recycling technology is in an immature stage, a recycling cost is very high, most enterprises can only recycle high-value elements, and a few enterprises can comprehensively recycle the waste lithium iron phosphate battery, and even individual enterprises can comprehensively recycle the high-value elements, it is difficult to realize industrial application of the waste lithium iron phosphate battery due to a complex process and a high production cost.

The patent application (publication number: CN111646447A and publication date: Sep. 11, 2020) discloses a method for recycling iron phosphate from an iron-phosphate slag after lithium extraction of a lithium iron phosphate battery, and the method comprises the following steps of: S1) mixing an iron-phosphate slag obtained after lithium extraction of the lithium iron phosphate battery with water for slurry preparation to obtain a prepared slurry; S2) mixing the prepared slurry with acid to react, and performing solid-liquid separation to obtain a separating liquid A; S3) mixing the separating liquid A with iron powder to react, and performing solid-liquid separation to obtain a separating liquid B; S4) performing ion exchange for aluminum removal on the separating liquid B with ion exchange resin, and then adding FeSP4·7H2O or H3PO4 to adjust a molar ratio of phosphorus to iron in a system to be (1 to 2):1 to obtain a raw material liquid; and S5) mixing the raw material liquid with hydrogen peroxide and ammonia water to react, so as to form the iron phosphate. The defects are as follows: the iron-phosphate slag is dissolved with strong acid and then excess acid is neutralized with the iron powder, the iron-phosphorus ratio is adjusted with phosphoric acid, and the finally synthesized iron phosphate consumes a lot of alkali when a PH value is controlled, resulting in a high production cost; and the aluminum removal is realized by the ion exchange method in the production of the iron phosphate, with a high wastewater treatment capacity, and there are still some problems such as limited impurity removal types and a low purity of the iron phosphate.

The patent application (publication number: CN111653846A and publication date: Sep. 11, 2020) discloses a treatment method of a waste lithium iron phosphate battery, and the treatment method comprises the following steps of: pre-treating the waste lithium iron phosphate battery by discharging, disassembling, separating and the like, then putting separated lithium iron phosphate powder into water, stirring, and performing strengthening treatment by an ultrasonic wave; after reaction for a certain time, performing solid-liquid separation to obtain a filtered lithium ion solution and an iron phosphate precipitate; and adding carbonate to the lithium ion solution to obtain lithium carbonate, and mixing the lithium carbonate with the iron phosphate to roast to obtain a regenerated lithium iron phosphate material. The defects are as follows: the strengthening treatment by the ultrasonic wave is a physical treatment method, which is insufficient to separate the lithium ion solution and the iron phosphate precipitate, and the separated iron phosphate precipitate cannot regenerate battery-grade lithium iron phosphate without impurity removal.

The patent application (publication number: CN111675203A and publication date: Sep. 18, 2020) discloses a method for recycling lithium from a waste lithium iron phosphate battery and a method for recycling lithium and iron phosphate. The method for recycling the lithium comprises the following steps of: a) mixing positive and negative electrode powder with water for slurry preparation to obtain a slurry 1; b) mixing the slurry 1 with concentrated sulfuric acid and hydrogen peroxide to react, and performing solid-liquid separation to obtain a primary leaching solution and a primary carbon-containing iron-phosphate slag; c) mixing the positive and negative electrode powder with the primary leaching solution for slurry preparation to obtain a slurry 2; d) mixing the slurry 2 with concentrated sulfuric acid and hydrogen peroxide to react, and performing solid-liquid separation to obtain a secondary leaching solution and a secondary carbon-containing iron-phosphate slag; e) adjusting a pH of the secondary leaching solution to be 11 to 12.5 with an alkaline substance to react, and performing solid-liquid separation to obtain an impurity removal liquid; and f) reacting the impurity removal liquid with sodium carbonate to form lithium carbonate; wherein the positive and negative electrode powder is obtained by the following method of: roasting, crushing and screening positive and negative electrode sheets disassembled from the waste lithium iron phosphate battery to obtain copper-aluminum mixed powder and the positive and negative electrode powder. The method for recycling the lithium and the iron phosphate from the waste lithium iron phosphate battery comprises the following steps of: K1) recycling positive and negative electrode powder to obtain lithium carbonate, a primary carbon-containing iron-phosphate slag and a secondary carbon-containing iron-phosphate slag; K2 mixing the primary carbon-containing iron-phosphate slag and the secondary carbon-containing iron-phosphate slag with water for slurry preparation to obtain a prepared slurry; K3) mixing the prepared slurry with acid to react, and performing solid-liquid separation to obtain a first separating liquid; K4) mixing the first separating liquid with iron powder to react, and performing solid-liquid separation to obtain a second separating liquid; K5) performing ion exchange for aluminum removal on the second separating liquid with ion exchange resin, and then adding FeSO4·7H2O or H3PO4 to adjust a molar ratio of phosphorus to iron in a system to be (1 to 2):1 to obtain a raw material liquid; and K6) mixing the raw material liquid with hydrogen peroxide and ammonia water to react, so as to form the iron phosphate. The defects are as follows: the decomposition with strong acid refers to dissolving the lithium and the iron phosphate together, resulting in a high subsequent treatment cost and great wastes of iron ions and phosphate ions; and the aluminum removal is realized by the ion exchange method in the production of the iron phosphate, with a high wastewater treatment capacity, and there are some problems such as limited impurity removal types and an inability to regenerate battery-grade iron phosphate.

SUMMARY

Technical Problems

In the prior art above, a process flow of comprehensive recycling of lithium and iron phosphate is complex, cannot realize selective lithium extraction, has a low-concentration lithium solution, large material consumption for lithium precipitation, a great loss of phosphate ions, a low recycling rate, a high production cost and a low product purity, and increases a difficulty of impurity removal for subsequent processing, and in addition, there is a large amount of waste water, which increases a pressure of environmental protection, so that it is difficult to realize industrial application.

The present invention aims to overcome the defects in the prior art, and disclose a comprehensive recycling method for a waste lithium iron phosphate battery, which has a simple process flow, a small amount of waste water and a low production cost, and can be applied to industrial applications.

Problem Solutions

Technical Solutions

A technical solution of the present invention is: a comprehensive recycling method for a waste lithium iron phosphate battery, which comprises: first selectively extracting lithium, and then using a lithium extraction residue to prepare iron phosphate.

The selectively extracting the lithium comprises: first adding waste lithium iron phosphate positive and negative electrode powder to water or a lithium-containing solution to prepare a slurry, and then adjusting a PH of the slurry to be 1.5 to 2.0 with hydrochloric acid; and then adding solid sodium chlorate to the slurry, selectively dissolving the lithium in the solution, leaving the iron phosphate in the residue, and then performing solid-liquid separation to obtain the lithium-containing solution and the iron-phosphate-containing lithium extraction residue.

The using the lithium extraction residue to prepare the iron phosphate comprises the following steps of: S1) adding the lithium extraction residue to water according to a mass ratio of 1/3-5 to prepare a slurry;

S2) adjusting a PH of the slurry to be 0.5 to 1.0 with hydrochloric acid and stirring to react, so that an iron content in a solid phase of the slurry is dissolved to be less than or equal to 1.0%;

S3) performing filter-pressing and washing on the slurry obtained in the step S2), a filter cake being a decomposed residue, and performing innocuous disposal; and allowing a filtrate and a washing liquid to enter the next working procedure;

S4) on the basis of iron and phosphorus contents of the liquid obtained by filter-pressing in the step S3), adding trisodium phosphate or ferric chloride, controlling a PH to be 0.5 to 1.0 to react for at least 0.5 hour, and then controlling the PH to be 1.5 to 2.0 with a sodium hydroxide solution to precipitate the iron phosphate; and S5) performing filter-pressing and washing after the step S4): combining a filtrate and a washing liquid to enter a wastewater treatment station, a filter cake being crude iron phosphate.

Preferably, in the working procedure of selectively extracting the lithium, the waste lithium iron phosphate positive and negative electrode powder is added to the water or the lithium-containing solution according to a mass ratio of 1/3-5 to prepare the slurry.

Preferably, in the working procedure of selectively extracting the lithium, the solid sodium chlorate is added to the slurry according to an amount of 0.35 to 0.4 times of ferrous iron.

Preferably, in the working procedure of selectively extracting the lithium, the selectively dissolving the lithium in the solution comprises converting all ferrous iron ions in the slurry added with the solid sodium chlorate to react into ferric iron ions and then performing solid-liquid separation, a filtrate being a lithium-containing solution, when a lithium content of the lithium-containing solution is less than 15 g/L, returning to the slurry preparation procedure to prepare the slurry, so as to increase the lithium content of the lithium-containing solution, when the lithium content of the lithium-containing solution is greater than 15 g/L, adding the sodium hydroxide solution to adjust a PH value to be 8.5 to 9.5, so that copper, aluminum and other metal ions in the solution form a hydroxide precipitate, and performing filter-pressing and washing, a filter cake being a copper-aluminum slag and a filtrate being a pure lithium-containing solution.

Further, after the working procedure of selectively extracting the lithium, the lithium-containing solution is allowed to precipitate lithium carbonate: the lithium-containing solution is pumped to a lithium precipitation barrel, a saturated sodium carbonate solution is added to form a lithium carbonate precipitate, a filtrate after filter-pressing is treated and then returns to the slurry preparation procedure, and a filter cake is a lithium carbonate product.

Preferably, in the step S2), the stirring to react comprises maintaining a pH value with hydrochloric acid, and stirring for 1 hour to 3 hours, preferably 2 hours.

Preferably, the adding the trisodium phosphate or the ferric chloride comprises adding the trisodium phosphate or the ferric chloride according to a molar ratio of iron to phosphorus of 1/0.97-1.02 by detecting iron and phosphorus contents of the liquid.

Further, reverse three-stage washing to remove impurities is performed after preparing the crude iron phosphate: the crude iron phosphate filter cake is prepared into a washing liquid with a pH value of 1.5 with pure water and hydrochloric acid, reverse washing is performed for three times to wash away other metal salts in the crude iron phosphate to obtain a pure iron phosphate filter cake, and drying and crushing are performed to obtain a battery iron phosphate product.

Further, the reverse three-stage washing to remove impurities comprises the following steps of: b1) preparation of washing liquid: adding guaranteed pure hydrochloric acid to pure water to prepare a hydrochloric acid washing liquid with a pH of 1.5 to 2.0 for later use;

b2) first washing: adding the crude iron phosphate filter cake to second washing water according to a mass ratio of 1/3-5, stirring for 30 minutes to 60 minutes, performing filter-pressing and washing with the second washing water, allowing a filtrate and a washing liquid to enter the wastewater treatment station, and allowing a filter cake to enter second washing;

b3) second washing: adding the crude iron phosphate filter cake obtained by the first washing to third washing water according to a mass ratio of 1/3-5, stirring for 30 minutes to 60 minutes, performing filter-pressing and washing with the third washing water, and using a filtrate and a washing liquid for the first washing; and allowing a filter cake to enter third washing; and b4) third washing: adding the crude iron phosphate filter cake obtained by the second washing to the prepared elements at the same time, greatly reduces a relative production cost by about 25%, and is applied to industrial applications.

BRIEF DESCRIPTION OF THE DRAWINGS

Description of the Drawings

FIG. 1 is a process flow chart of the present invention.

OPTIMAL EMBODIMENTS FOR IMPLEMENTING THE INVENTION

Optimal Implementations of the Invention

Materials for implementing a comprehensive recycling method for a waste lithium iron phosphate battery are as follows (disassembled positive and negative electrode material powder).

| Item | Detection result (%) | | | | | | | | | |
| --- | --- | --- | --- | --- | --- | --- | --- | --- | --- | --- |
| | U | Fe | P | Al | Cu | Co | Ni | Mn | Ca | Cd |
| Material (dry basis) | 3.1 | 25.0 | 13.85 | 1.24 | 1.04 | 0.01 | 0.02 | 0.05 | 0.0004 | 0.0005 | hydrochloric acid washing liquid with the pH of 1.5 to 2.0 according to a mass ratio of 1/3-5, stirring for 30 minutes to 60 minutes, performing filter-pressing and washing with the prepared hydrochloric acid washing liquid with the pH of 1.5 to 2.0, and using a filtrate and a washing liquid for the second washing; and using a filter cake as pure iron phosphate, and performing drying and crushing after qualified detection to obtain a battery-grade iron phosphate product.

Further, the drying and crushing comprise: drying the pure iron phosphate filter cake by a microwave drying oven at a temperature of at most 90° C. until a water content is at most 0.1%, crushing to be at most 5 µm by a jet mill, and packaging to obtain the battery-grade iron phosphate product.

Beneficial Effects of the Invention

Beneficial Effects

Because of using the technical solution above, the present invention overcomes the defects in the prior art, and since an oxidant is used for selective lithium extraction and PH value controlling, most part of the iron phosphate remains in the lithium extraction residue; then the PH value is adjusted with the hydrochloric acid, the iron phosphate in the dissolved residue is separated from other impurities in the residue, after liquid-solid separation, the liquid is the crude iron phosphate solution, then the trisodium phosphate or the ferric chloride is additionally added to adjust the ratio of iron to phosphate, and then the PH value is adjusted to synthesize the iron phosphate; and the reverse three-stage washing to remove impurities is performed to obtain the battery-grade iron phosphate product. The method has a simple process flow and low material consumption, a direct recycling rate of the iron phosphate of more than 93% and an amount of waste water reduced by more than 75%, solves the problem of environmental protection and recycles all of the valuable The method comprises the steps as follows. In S1), a slurry is prepared: 5 tons of waste lithium iron phosphate positive and negative electrode powder is added to water or a lithium-containing solution according to a mass ratio of 1/4 to prepare the slurry by a 20 m³ reaction kettle.

In S2), a PH of the material slurry is adjusted to be 2.0 with hydrochloric acid.

In S3), lithium is selectively extracted: 532 kg of solid sodium chlorate is added to the material slurry according to an amount of 0.35 times of ferrous iron to react at 80° C. for 60 minutes.

In S4), filter-pressing and washing are performed, and thickening is performed twice: filter-pressing and washing are performed by a plate-and-frame filter press, a filter cake is allowed to extract a lithium residue, a filtrate is a lithium-containing solution, the slurry preparation procedure in the step S1) is returned for slurry preparation, and the selective lithium extraction is repeated twice to increase a lithium content of the lithium-containing solution.

In S5), impurities are removed: a sodium hydroxide solution is added to the thickened lithium-containing solution to adjust a PH value to be 8.5, the mixture is stirred for 30 minutes, filter-pressing and washing are performed, a filter cake is a copper-aluminum slag, and innocuous disposal is performed; and a filtrate and a washing liquid are controlled to be 18 m³, and enter the next working procedure.

In S6), lithium carbonate is precipitated: the filtrate is pumped to a lithium precipitation barrel, a saturated sodium carbonate solution is added to form a lithium carbonate precipitate, and a filtrate after filter-pressing returns to the slurry preparation procedure in the step S1); and a filter cake is a lithium carbonate product.

In S7), iron phosphate is dissolved: the lithium extraction residue in the step S4) is received by a 20 m³ reaction kettle, added with water to prepare a slurry with a mass ratio of about 1/4, and added with concentrated hydrochloric acid to adjust a PH to be 0.5, the pH value is maintained with hydrochloric acid at the same time, and the mixture is stirred for 3 hours.

In S8), filter-pressing and washing are performed: a filter cake is a decomposed residue, and innocuous disposal is performed; and a filtrate and a washing liquid are combined.

In S9), the iron phosphate is synthesized: iron and phosphorus contents of the filtrate and the washing liquid after filter-pressing in the step S8) are detected, trisodium phosphate or ferric chloride is added to ensure that a molar ratio of iron to phosphorus is 1/0.97-1.02, a PH is controlled to be 0.5 to react for 1.5 hours, and then the PH is controlled to be 1.5 with a sodium hydroxide solution to precipitate the iron phosphate.

In S10), filter-pressing and washing are performed: filter-pressing and washing are performed by a plate-and-frame filter press, and a filtrate and a washing liquid are combined to enter a wastewater treatment station; and a filter cake is crude iron phosphate, and enters the next working procedure.

In S11), reverse three-stage washing to remove impurities is performed: the crude iron phosphate filter cake is stirred and reversely washed for three times with a washing liquid with a PH value of 1.5 to wash away other metal salts in the crude iron phosphate, so as to obtain a pure iron phosphate filter cake, wherein the steps are as follows. In (1), a washing liquid is prepared: 18 m³ of pure water is added to an acid adjusting barrel of 20 m³ of pure water, and added with guaranteed pure hydrochloric acid to prepare a liquid with a pH of 1.5 for later use.

In (2), first washing is performed: the crude iron phosphate filter cake is added to second washing water according to a mass ratio of 1/5, the mixture is stirred for 30 minutes, filter-pressing and washing with the second washing water are performed, and a filtrate and a washing liquid enter the wastewater treatment station; and a filter cake enters second washing.

In (3), second washing is performed: the crude iron phosphate filter cake is added to third washing water according to a mass ratio of 1/5, the mixture is stirred for 30 minutes, filter-pressing and washing with the third washing water are performed, and a filtrate and a washing liquid are used for the first washing; and a filter cake enters third washing.

In (4), third washing is performed: the crude iron phosphate filter cake is added to new washing water according to a mass ratio of 1/5, the mixture is stirred for 30 minutes, filter-pressing and washing with the new washing water are performed, and a filtrate and a washing liquid are used for the second washing; and a filter cake is used as pure iron phosphate, and a drying procedure is entered after qualified detection.

In S12), drying and crushing are performed: the pure iron phosphate filter cake is dried by a microwave drying oven at a temperature of 90° C. until a water content is 0, 1%, and the dried filter cake is crushed to be within 5 μm by a jet mill, and packaged to obtain the battery-grade iron phosphate product.

DETAILED DESCRIPTION

Implementations of the Present Invention

In order to understand the present invention more clearly, the present invention is further described in detail hereinafter by specific implementations with reference to FIG. 1.

Implementation: a comprehensive recycling method for a waste lithium iron phosphate battery comprises: first selectively extracting lithium, and then using a lithium extraction residue to prepare iron phosphate.

The selectively extracting the lithium comprises: first adding waste lithium iron phosphate positive and negative electrode powder to water or a lithium-containing solution to prepare a slurry, and then adjusting a PH of the slurry to be 1.5 to 2.0 with hydrochloric acid; and then adding solid sodium chlorate to the slurry, selectively dissolving the lithium in the solution, leaving the iron phosphate in the residue, and then filtering to obtain the lithium-containing solution and the iron-phosphate-containing lithium extraction residue.

The reaction mechanism is that: $6LiFePO4+NaClO3+6HCl=6FePO4+6LiCl+NaCl+3H2O$. The using the lithium extraction residue to prepare the iron phosphate comprises the following steps. In S1), the lithium extraction residue is added to water according to a mass ratio of 1/3-5 to prepare a slurry.

In S2), a PH of the slurry is adjusted to be 0.5 to 1.0 with hydrochloric acid and stirred to react, so that an iron ion content in a solid phase of the slurry is dissolved to be less than or equal to 1.0%.

In S3), filter-pressing and washing are performed on the slurry obtained in the step S2), a filter cake is a decomposed residue, and innocuous disposal is performed; and a filtrate and a washing liquid enter the next working procedure.

In S4), on the basis of iron and phosphorus contents of the liquid obtained by filter-pressing in the step S3), trisodium phosphate or ferric chloride is added, a PH is controlled to be 0.5 to 1.0 to react for at least 0.5 hour, and then the PH is controlled to be 1.5 to 2.0 with a sodium hydroxide solution to precipitate the iron phosphate.

In S5), filter-pressing and washing are performed after the step S4): a filtrate and a washing liquid are combined to enter a wastewater treatment station, and a filter cake is crude iron phosphate.

According to the present invention, the hydrochloric acid and the solid sodium chlorate are selected in the selective lithium extraction, because sulfate radical in a product may be ignored in subsequent regeneration of the iron phosphate, while chloride radical may be washed away with the washing liquid. The purpose of using the solid sodium chlorate is to reduce a solid-liquid ratio, so as to ensure that addition of an oxidant does not increase a volume of the lithium-containing solution and ensure a lithium-containing concentration. The PH value is determined to be 1.5 to 2.0, because, according to the reaction mechanism, the iron phosphate has been formed while selectively extracting the lithium, and if the PH value is less than 1.5, although recycling of the lithium is slightly increased, a large part of the iron phosphate in the residue may be dissolved into the lithium-containing solution, which not only brings a difficulty to subsequent impurity removal of the lithium-containing solution, but also causes a loss of a large number of iron and phosphorus sources, thus greatly reducing a subsequent recycling rate of the iron phosphate from the residue; and if the PH value is greater than 2.0, a dissolution rate of the lithium is greatly reduced, thus losing a practical significance of the lithium extraction procedure.

According to the present invention, in preparation of the iron phosphate with the lithium extraction residue, materials are framed to be only the hydrochloric acid and the sodium chlorate, and the residue with the PH of 1.5 to 2.0 after selectively extracting the lithium. Other residues are not suitable for this process, because almost all iron and phosphorus in a residue with a PH value less than 1.5 during lithium extraction are lost, thus losing a significance of the iron phosphate regeneration; and too many impurities exist in a residue with a PH value greater than 2.0 after dissolution, thus having a complex impurity removal procedure and a high cost. The hydrochloric acid is framed to be used for residue dissolution, because a solubility of the iron phosphate in the hydrochloric acid is much higher than that in other acids.

The PH value of the dissolved residue is framed to be 0.5 to 1.0, because the dissolution rate of the iron phosphate meets a recycling requirement in this PH range, and if the PH value of the dissolved residue is less than 0.5, a relatively large amount of acid is consumed, and a large amount of alkali needs to be consumed to adjust the PH to be 1.5 when the iron phosphate is precipitated after the iron phosphate is synthesized, resulting in an excessively high cost; and if the PH value of the dissolved residue is greater than 1.0, the dissolution rate of the iron phosphate can be gradually reduced, and when the PH value reaches 1.5, the dissolution rate of the iron phosphate is almost zero.

According to the present invention, in the working procedure of selectively extracting the lithium, the waste lithium iron phosphate positive and negative electrode powder is added to the water or the lithium-containing solution according to a mass ratio of 1/3-5 to prepare the slurry. In some embodiments of the present invention, the waste lithium iron phosphate positive and negative electrode powder is added to the water or the lithium-containing solution according to a mass ratio of 1:4. Since the slurry is operated and transported in a stirred state, if the solid-liquid ratio is too small, the slurry is difficult to operate and transport, which easily leads to pipeline blockage; and if the solid-liquid ratio is too large, a concentration of a target element in a dissolving liquid is low, and the solid-liquid ratio is generally set to be 1/3-5.

According to the present invention, in the working procedure of selectively extracting the lithium, the solid sodium chlorate is added to the slurry according to an amount of 0.35 to 0.4 times of ferrous iron.

The reaction mechanism is that: $6LiFePO_4+NaClO_3+6HCl=6FePO_4\downarrow+6LiCl+NaCl+3H2O$.

A molar ratio of sodium chlorate to iron is 1/6, which means that a mass ratio is that $106/6\times56=0.3154$.

When an excess coefficient is 1.1 to 1.25, the mass ratio of sodium chlorate to iron is 0.35 to 0.4.

According to the present invention, in the working procedure of selectively extracting the lithium, the selectively extracting the lithium comprises oxidizing all ferrous iron ions of the lithium iron phosphate in the slurry added with the solid sodium chlorate to react into ferric iron ions to convert the lithium iron phosphate into the iron phosphate, freeing lithium ions, performing solid-liquid separation, a filtrate being a lithium-containing solution, when a lithium content of the lithium-containing solution is less than 15 g/L, returning to the slurry preparation procedure to prepare the slurry, so as to increase the lithium content of the lithium-containing solution, when the lithium content of the lithium-containing solution is greater than 15 g/L, adding the sodium hydroxide solution to adjust a PH value to be 8.5 to 9.5, so that copper, aluminum and other metal ions in the solution form a hydroxide precipitate, performing filter-pressing and washing, a filter cake being a copper-aluminum slag, and reprocessing by a conventional method or selling to related manufacturers; and a filtrate being a pure lithium-containing solution. The metal ions are completely hydrolyzed at a PH value of 9.0, and an amphoteric oxide of aluminum may be dissolved when the PH value exceeds 9.5, so that the PH value is controlled to be 8.5 to 9.5.

According to the present invention, after the working procedure of selectively extracting the lithium, the lithium-containing solution is allowed to precipitate lithium carbonate: the lithium-containing solution is pumped to a lithium precipitation barrel, a saturated sodium carbonate solution is added to form a lithium carbonate precipitate, a filtrate after filter-pressing is treated and then returns to the slurry preparation procedure of the selective lithium extraction, and a filter cake is a lithium carbonate product. In some embodiments of the present invention, the lithium-containing solution is used for preparing lithium hydroxide, lithium phosphate, and the like by a conventional preparation method well known to those skilled in the art.

According to the present invention, in the step S2), the stirring to react comprises maintaining a pH value with hydrochloric acid, and stirring for 1 hour to 3 hours. In some embodiments of the present invention, the stirring lasts for 2 hours.

According to the present invention, in the step S4), the adding the trisodium phosphate or the ferric chloride comprises adding the trisodium phosphate or the ferric chloride according to a molar ratio of iron to phosphorus of 1/0.97-1.02 by detecting iron and phosphorus contents of the liquid. The ferric chloride is added to supplement iron ions, and the trisodium phosphate is added to supplement phosphorus, so as to adjust the molar ratio of iron to phosphorus. If the iron ions are less, the ferric chloride is added, and if the phosphorus is less, the trisodium phosphate is added, which depends on a detection situation. The trisodium phosphate is alkaline, so that a certain amount of alkali may be saved when precipitating the iron phosphate, which is more suitable than adding phosphoric acid or sodium dihydrogen phosphate.

According to the present invention, in the step S4), the reaction lasts for at least 0.5 hour, which may be 0.5 hour to 2 hours, and in some embodiments, the reaction lasts for 0.5 hour, 1 hour, 1.5 hours or 2 hours. The reaction for 0.5 hour is basically in place, and the reaction for 1 hour to 1.5 hours is completely in place.

According to the present invention, reverse three-stage washing to remove impurities is performed after preparing the crude iron phosphate: the crude iron phosphate filter cake is prepared into a washing liquid with a pH value of 1.5 with pure water and hydrochloric acid, reverse washing is performed for three times to wash away other metal salts in the crude iron phosphate to obtain a pure iron phosphate filter cake, and drying and crushing are performed to obtain a battery iron phosphate product.

According to the present invention, the purpose of the reverse three-stage washing is to save water, and total water consumption of the three-stage washing is equal to 1⁄3 of total water consumption of single machine washing for three times, thus reducing a burden of wastewater treatment. Industrial production results show that, no more and no less, the washing for three times may achieve the best effect, so that the iron phosphate product can meet a battery-grade requirement.

According to the present invention, the reverse three-stage washing to remove impurities comprises the following steps. In a), a washing liquid is prepared: guaranteed pure hydrochloric acid is added to pure water to prepare a hydrochloric acid washing liquid with a pH of 1.5 to 2.0 for later use.

In b), first washing is performed: the crude iron phosphate filter cake is added to second washing water according to a mass ratio of 1/3-5, and stirred for 30 minutes to 60 minutes, filter-pressing and washing with the second washing water are performed, a filtrate and a washing liquid enter the wastewater treatment station, and a filter cake enters second washing.

In c), second washing is performed: the crude iron phosphate filter cake obtained by the first washing is added to third washing water according to a mass ratio of 1/3-5, and stirred for 30 minutes to 60 minutes, filter-pressing and washing with the third washing water are performed, and a filtrate and a washing liquid are used for the first washing; and a filter cake enters third washing.

In d), third washing is performed: the crude iron phosphate filter cake obtained by the second washing is added to the prepared hydrochloric acid washing liquid with the pH of 1.5 to 2.0 according to a mass ratio of 1/3-5, and stirred for 30 minutes to 60 minutes, filter-pressing and washing with the prepared hydrochloric acid washing liquid with the pH of 1.5 to 2.0 are performed, and a filtrate and a washing liquid are used for the second washing; and a filter cake is used as pure iron phosphate, and drying and crushing are performed after qualified detection to obtain a battery-grade iron phosphate product.

According to the present invention, the drying and crushing comprise: drying the pure iron phosphate filter cake by a microwave drying oven at a temperature of at most 90° C. until a water content is at most 0, 1%, crushing to be at most 5 μm by a jet mill, and packaging to obtain the battery-grade iron phosphate product.

According to the present invention, the pure water and the guaranteed pure hydrochloric acid are framed to be the washing liquid for washing the crude iron phosphate filter cake, because we use an acid washing liquid to wash away impurities, without needing to add an additional impurity removal procedure, so that an impurity requirement for the washing liquid is very high. The PH value of the washing liquid is framed to be 1.5 to 2.0, because a loss of the iron phosphate is the smallest in this PH range, and the impurities can also be washed away to the maximum extent, and if the PH value of the washing liquid is less than 1.5, a part of the iron phosphate may be lost with the washing liquid, so that a recycling rate of the iron phosphate is reduced; and if the PH value of the washing liquid is greater than 2.0, some impurities are insoluble in the washing liquid to remain in the iron phosphate, so that the product fails to meet the battery-grade requirement. The present invention overcomes the defects in the prior art, and since an oxidant is used for selective lithium extraction and PH value controlling, most part of the iron phosphate remains in the lithium extraction residue; then the PH value is adjusted with the hydrochloric acid, the iron phosphate in the dissolved residue is separated from other impurities in the residue, after liquid-solid separation, the liquid is the crude iron phosphate solution, then the trisodium phosphate or the ferric chloride is additionally added to adjust the ratio of iron to phosphate, and then the PH value is adjusted to synthesize the iron phosphate; and the reverse three-stage washing to remove impurities is performed to obtain the battery-grade iron phosphate product. The process is simple, the material consumption is reduced, and the direct recycling rate of the iron phosphate is more than 93%. This recycling rate refers to a one-time direct recycling rate of the iron phosphate from the residue, because a dissolving acidity for dissolving the residue is reduced to ensure a quality of the iron phosphate and reduce consumption of alkali for precipitating the iron phosphate, so that a small amount of the iron phosphate is not dissolved, and a part of the iron phosphate is lost with the washing liquid during washing to remove impurities. After being collected in the wastewater station, this lost part of the iron phosphate is precipitated and separated, and then returns to a system. A dissolution rate of the lithium is more than 98%, sodium hydroxide is reduced by about 270 kg when 1 ton of lithium iron phosphate waste is treated, and an amount of waste water is reduced by more than 75%, so that the method solves the problem of environmental protection and recycles all of the valuable elements at the same time, reduces a relative production cost by about 25%, and is applied to industrial applications.

Calculation bases of relevant effect data of the present invention are as follows.

1. Calculation basis of material consumption reduction: when the lithium is extracted, dissolution is performed with strong acid or low acid, the PH must be controlled to be 1.5 to 2.0 with alkali to precipitate the iron phosphate, and excess acid must be neutralized with alkali: $HCl+NaOH=NaCl+H2O$, wherein a reaction molar ratio is 1/1.

In decomposition with strong acid (4N), an acidity is calculated to be 2 N at the end of the reaction, and if 5 tons of lithium iron phosphate waste is controlled to be verified with 18 m$^3$ of solution, a final pH is 1.5, which is calculated to be about 0.10 N, so that a reduction amount of acidity is that: 2-0.1=1.9 N, an amount of alkali for neutralization is 1.9 N, and an amount of alkali for 18 m$^3$ is that 1.9×40×18=1.368 tons (NaOH), wherein 273.6 kg of alkali is consumed for per ton of lithium iron phosphate waste.

An amount of alkali in the case of low acid (with a PH of 1.5, which is about 0.10 N) is that: if 5 tons of lithium iron phosphate waste is controlled to be verified with 18 m$^3$ of solution, a final pH is calculated to be 1.5, so that a reduction degree of acidity is that: 0.1−0.1-0 N, an amount of alkali for neutralization is 0 N, and an amount of alkali for 18 m$^3$ is that: there is almost no need for neutralization in this case.

Therefore, in the technical solution of the present invention, the sodium hydroxide is reduced by 273.6 kg for per ton of lithium iron phosphate waste in the selective lithium extraction.

2. Calculation basis of waste water amount reduction: (1) the ion exchange method is used to remove impurities, 3% to 10% (mass fraction) sulfuric acid solution is used for elution at a flow rate of 3 BV/h, wherein 6 BV of sulfuric acid solution is used in total, and then washing with water is performed until a PH is greater than 6, wherein an amount of the washing water is 6 BV to 8 BV, and the washing water for resin regeneration alone may reach 15 mV for per ton of lithium iron phosphate waste.

(2) An amount of washing water for reverse three-stage washing is that: 18 m$^3$ of washing water is used for 5 tons of lithium iron phosphate waste, and 3.6 m$^3$ of washing water is used for per ton of lithium iron phosphate waste, so that a reduction amount of the washing water is that (15−3.6)/15×100=76%.

3. Calculation basis of production cost reduction: (1) a saving amount of hydrochloric acid is that: 273.6/40×36=336.24 kg, and a content of commercially available hydrochloric acid is 32%, with a price of 500 Yuan/ton, so that 336.24/0.32/1000×500=525.38 Yuan.

(2) A saving amount of sodium hydroxide is that: 273.6/1000×3500=957.6 Yuan.

(3) A water treatment cost is that: a treatment cost per ton of water is about 80 Yuan, so that (15−3.6)×80=912 Yuan.

A saving cost on treatment of 1 ton of lithium iron phosphate waste is about that 525.38+957.6+912=2394.98 Yuan, accounting for about 25% of total production cost.

Embodiment 1: Materials for implementing a comprehensive recycling method for a waste lithium iron phosphate battery were as follows (disassembled positive and negative electrode material powder).

| Item | Detection result (%) | | | | | | | | | |
|------|------|------|------|------|------|------|------|------|------|------|
|      | Li   | Fe   | P    | Al   | Cu   | Co   | Ni   | Mn   | Ca   | Cd   |
| Material (dry basis) | 3.1 | 25.0 | 13.85 | 1.24 | 1.04 | 0.01 | 0.02 | 0.05 | 0.0004 | 0.0005 |

The following steps were implemented. In S1), a slurry was prepared: 5 tons of waste lithium iron phosphate positive and negative electrode powder was added to water or a lithium-containing solution according to a mass ratio of 1/4 to prepare the slurry by a 20 m³ reaction kettle.

In S2), a PH of the material slurry was adjusted to be 1.5 with hydrochloric acid.

In S3), lithium was selectively extracted: 532 kg of solid sodium chlorate was added to the material slurry according to an amount of 0.35 times of ferrous iron to react at 80° C. for 60 minutes.

In S4) filter-pressing and washing were performed, and thickening was performed once: filter-pressing and washing were performed by a plate-and-frame filter press, a filter cake was allowed to extract a lithium residue, a filtrate was a lithium-containing solution, and the step S1) was returned for repeated lithium extraction to thicken the lithium-containing solution once.

In S5), impurities were removed: a sodium hydroxide solution was added to the thickened lithium-containing solution to adjust a PH value to be 9.0, the mixture was stirred for 30 minutes, filter-pressing and washing were performed, a filter cake was a copper-aluminum slag, and innocuous disposal was performed; and a filtrate and a washing liquid were controlled to be 18 m³, and entered the next working procedure.

In S6), lithium carbonate was precipitated: the filtrate was pumped to a lithium precipitation barrel, a saturated sodium carbonate solution was added to form a lithium carbonate precipitate, and a filtrate after filter-pressing returned to the slurry preparation procedure in the step S1); and a filter cake was a lithium carbonate product.

In S7), iron phosphate was dissolved: the lithium extraction residue in the step S6) was received by a 20 m³ reaction kettle, added with water to prepare a slurry with a mass ratio of about 1/4, and added with concentrated hydrochloric acid to adjust a PH to be 1.0, the pH value was maintained with hydrochloric acid at the same time, and the mixture was stirred for 3 hours.

In S8), filter-pressing and washing were performed: a filter cake was a decomposed residue, and innocuous disposal was performed; and a filtrate and a washing liquid were combined.

In S9), the iron phosphate was synthesized: iron and phosphorus contents of the filtrate and the washing liquid after filter-pressing in the step S8) were detected, trisodium phosphate or ferric chloride was added to ensure that a molar ratio of iron to phosphorus was 1/0.97-1.02, a PH was controlled to be 0.5 to react for 1.0 hours, and then the PH was controlled to be 1.5 with a sodium hydroxide solution to precipitate the iron phosphate.

In S10), filter-pressing and washing were performed: filter-pressing and washing were performed by a plate-and-frame filter press, and a filtrate and a washing liquid were combined to enter a wastewater treatment station; and a filter cake was crude iron phosphate, and entered the next working procedure.

In S11), reverse three-stage washing to remove impurities was performed: the crude iron phosphate filter cake was stirred and reversely washed for three times with a washing liquid with a PH value of 1.5 to wash away other metal salts in the crude iron phosphate, so as to obtain a pure iron phosphate filter cake, wherein the steps were as follows. In (1), a washing liquid was prepared: 18 m³ of pure water was added to an acid adjusting barrel of 20 m³ of pure water, and added with guaranteed pure hydrochloric acid to prepare a liquid with a pH of 1.5 for later use.

In (2), first washing was performed: the crude iron phosphate filter cake was added to second washing water according to a mass ratio of 1/5, the mixture was stirred for 30 minutes, filter-pressing and washing with the second washing water were performed, and a filtrate and a washing liquid entered the wastewater treatment station; and a filter cake entered second washing.

In (3), second washing was performed: the crude iron phosphate filter cake was added to third washing water according to a mass ratio of 1/5, the mixture was stirred for 30 minutes, filter-pressing and washing with the third washing water were performed, and a filtrate and a washing liquid were used for the first washing; and a filter cake entered third washing.

In (4), third washing was performed: the crude iron phosphate filter cake was added to new washing water according to a mass ratio of 1/5, the mixture was stirred for 30 minutes, filter-pressing and washing with the new washing water were performed, and a filtrate and a washing liquid were used for the second washing; and a filter cake was used as pure iron phosphate, and a drying procedure was entered after qualified detection.

In S12), drying and crushing were performed: the pure iron phosphate filter cake was dried by a microwave drying oven at a temperature of 60° C. until a water content was 0, 1%, and the dried filter cake was crushed to be within 5 μm by a jet mill, and packaged to obtain the battery-grade iron phosphate product.

Detection data were as follows.

| Item | Condition | Detection result (g/L) | | | | | | | | | |
|---|---|---|---|---|---|---|---|---|---|---|---|
| | | Li | Fe | P | Al | Cu | Co | Ni | Mn | Ca | Cd |
| Embodiment 1 | Solid-liquid ratio: 1/4 PH of slurry: 1.5 Adding amoun tof sodium chlorate: 352 kg each time Number of times of thickening: 1 | 16.88 Dissolution rate: 98% | 0.69 Dissolution rate: 0.5% | 0.38 Dissolution rate: 0.5% | 1.67 Dissolution rate: 24.3% | 1.39 Dissolution rate: 24.1% | 0.033 | 0.060 | 0.18 | 0.0012 | 0.0015 |
| | Dissolving liquid of residue (g/L) Solid-liquid ratio: 1/4 PH of slurry: 1.0 | 0.24 Dissolution rate of lithium: 99.9% | 48.35 Dissolution rate of iron: 97.45% | 20.96 Dissolution rate of phosphorus: 96.54% | 1.95 Dissolution rate of aluminum: 92.17% | 1.65 Dissolution rate of copper: 91.82% | / | / | / | / | / |
| | Dissolved residue Natural basis (%) | / | 0.12 | 0.24 | / | / | / | / | / | / | / |
| | Crude iron phosphate Natural basis (%) | 0.0001 | 20.50 | 10.98 | 0.16 | 0.14 | 1.27 | 0.0007 | 0.0010 | 0.014 | 0.0008 |
| | Total washing liquid in washing for three times PH: 1.5 (g/L) | / | 2.51 | 1.078 | 0.37 | 0.34 | 3.41 | / | / | / | / |
| | Iron phosphate product Dry basis (%) | / | 29.08 Recycling rate of iron phosphate: 93.93% | 15.58 Recycling rate of iron phosphate: 93.93% | 0.0005 | 0.0005 | 0.0025 | 0.0005 | 0.0013 | 0.0014 | 0.0005 |

Effects of Embodiment 1 are shown as follows: the dissolution rate of the lithium is 99.9%, the dissolution rate of the iron phosphorus is 97.45%, the dissolution rate of the phosphorus is 96.54%, the dissolution rate of the aluminum is 92.17%, the dissolution rate of the copper is 91.82%, and contents of impurities in the iron phosphate (dry basis %) comprise: Al: 0.0005, Cu: 0.0005, Co: 0.0025, Ni: 0.0005, Mn: 0.0013, Ca: 0.0014, and Cd: 0.0005. The iron phosphate product meets a battery-grade quality requirement, with a recycling rate of 93.93%. The process is simple, the sodium hydroxide is reduced by 273.8 kg for per ton of lithium iron phosphate waste, the amount of waste water is reduced by 75%, and the relative production cost is reduced by 25.8%.

Embodiment 2: Materials for implementing a comprehensive recycling method for a waste lithium iron phosphate battery were the same as those in Embodiment 1. The method comprised the steps as follows. In S1), a slurry was prepared: 5 tons of waste lithium iron phosphate positive and negative electrode powder was added to water or a lithium-containing solution according to a mass ratio of 1/4 to prepare the slurry by a 20 m³ reaction kettle.

In S2), a PH of the material slurry was adjusted to be 2.0 with hydrochloric acid.

In S3), lithium was selectively extracted: 532 kg of solid sodium chlorate was added to the material slurry according to an amount of 0.35 times of ferrous iron to react at 80° C. for 60 minutes.

In S4), filter-pressing and washing were performed, and thickening was performed twice: filter-pressing and washing were performed by a plate-and-frame filter press, a filter cake was allowed to extract a lithium residue, a filtrate was a lithium-containing solution, the slurry preparation procedure in the step S1) was returned for slurry preparation, and the selective lithium extraction was repeated twice to increase a lithium content of the lithium-containing solution.

In S5), impurities were removed: a sodium hydroxide solution was added to the thickened lithium-containing solution to adjust a PH value to be 8.5, the mixture was stirred for 30 minutes, filter-pressing and washing were performed, a filter cake was a copper-aluminum slag, and innocuous disposal was performed; and a filtrate and a washing liquid were controlled to be 18 m³, and entered the next working procedure.

In S6), lithium carbonate was precipitated: the filtrate was pumped to a lithium precipitation barrel, a saturated sodium carbonate solution was added to form a lithium carbonate precipitate, and a filtrate after filter-pressing returned to the slurry preparation procedure in the step S1); and a filter cake was a lithium carbonate product.

In S7), iron phosphate was dissolved: the lithium extraction residue in the step S4) was received by a 20 m³ reaction kettle, added with water to prepare a slurry with a mass ratio of about 1/4, and added with concentrated hydrochloric acid to adjust a PH to be 0.5, the pH value was maintained with hydrochloric acid at the same time, and the mixture was stirred for 3 hours.

In S8), filter-pressing and washing were performed: a filter cake was a decomposed residue, and innocuous disposal was performed; and a filtrate and a washing liquid were combined.

In S9), the iron phosphate was synthesized: iron and phosphorus contents of the filtrate and the washing liquid after filter-pressing in the step S8) were detected, trisodium phosphate or ferric chloride was added to ensure that a molar ratio of iron to phosphorus was 1/0.97-1.02, a PH was controlled to be 0.5 to react for 1.5 hours, and then the PH was controlled to be 1.5 with a sodium hydroxide solution to precipitate the iron phosphate.

In S10), filter-pressing and washing were performed: filter-pressing and washing were performed by a plate-and-frame filter press, and a filtrate and a washing liquid were combined to enter a wastewater treatment station; and a filter cake was crude iron phosphate, and entered the next working procedure.

18

In S12), drying and crushing were performed: the pure iron phosphate filter cake was dried by a microwave drying oven at a temperature of 90° C. until a water content was 0, 1%, and the dried filter cake was crushed to be within 5 μm by a jet mill, and packaged to obtain the battery-grade iron phosphate product.

Detection data were as follows.

| Item | Condition | Detection result (g/L) | | | | | | | | | |
|---|---|---|---|---|---|---|---|---|---|---|---|
| | | Li | Fe | P | Al | Cu | Co | Ni | Mn | Ca | Cd |
| Embodiment 2 | Solid-liquid ratio: 1/4 PH of slurry: 1.5 Adding amount of sodium chlorate: 352 kg each time Number of times of thickening: 2 | 25.1 Dissolution rate: 98.1% | 1.03 Dissolution rate: 0.5% | 0.58 Dissolution rate: 0.5% | 4.77 Dissolution rate: 23.1% | 1.93 Dissolution rate: 22.3% | 0.037 | 0.068 | 0.20 | 0.0015 | 0.0022 |
| | Dissolving liquid of residue (g/L) Solid-liquid ratio: 1/4 PH of slurry: 0.5 | 0.15 Dissolution rate of lithium: 99.9% | 49.82 Dissolution rate of iron: 98.5% | 21.15 Dissolution rate of phosphorus: 96.62% | 2.04 Dissolution rate of aluminum: 99.10% | 1.81 Dissolution rate of copper: 98.72% | / | / | / | / | / |
| | Dissolved residue Natural basis (%) | / | 0.13 | 0.08 | / | / | / | / | / | / | / |
| | Total washing liquid in washing for three times PH: 1.5 (g/L) | / | 2.50 | 1.34 | 0.47 | 0.45 | 3.64 | / | / | / | / |
| | Iron phosphate product Dry basis (%) | / | 29.08 Recycling rate of iron phosphate: 93.98% | 15.58 Recycling rate of iron phosphate: 93.98% | 0.0005 | 0.0005 | 0.0025 | 0.0005 | 0.0008 | 0.0009 | 0.0005 |

In S11), reverse three-stage washing to remove impurities was performed: the crude iron phosphate filter cake was stirred and reversely washed for three times with a washing liquid with a PH value of 1.5 to wash away other metal salts in the crude iron phosphate, so as to obtain a pure iron phosphate filter cake, wherein the steps were as follows. In (1), a washing liquid was prepared: 18 m³ of pure water was added to an acid adjusting barrel of 20 m³ of pure water, and added with guaranteed pure hydrochloric acid to prepare a liquid with a pH of 1.5 for later use.

In (2), first washing was performed: the crude iron phosphate filter cake was added to second washing water according to a mass ratio of 1/5, the mixture was stirred for 30 minutes, filter-pressing and washing with the second washing water were performed, and a filtrate and a washing liquid entered the wastewater treatment station; and a filter cake entered second washing.

In (3), second washing was performed: the crude iron phosphate filter cake was added to third washing water according to a mass ratio of 1/5, the mixture was stirred for 30 minutes, filter-pressing and washing with the third washing water were performed, and a filtrate and a washing liquid were used for the first washing; and a filter cake entered third washing.

In (4), third washing was performed: the crude iron phosphate filter cake was added to new washing water according to a mass ratio of 1/5, the mixture was stirred for 30 minutes, filter-pressing and washing with the new washing water were performed, and a filtrate and a washing liquid were used for the second washing; and a filter cake was used as pure iron phosphate, and a drying procedure was entered after qualified detection.

Effects of Embodiment 2 are shown as follows: the dissolution rate of the lithium is 99.9%, the dissolution rate of the iron is 98.50%, the dissolution rate of the phosphorus is 96.62%, the dissolution rate of the aluminum is 99.10%, the dissolution rate of the copper is 98.72%, and contents of impurities in the iron phosphate (dry basis %) comprise: Al: 0.0005, Cu: 0.0005, Co: 0.0025, Ni: 0.0005, Mn: 0.0008, Ca: 0.0009, and Cd: 0.0005. The iron phosphate product meets a battery-grade quality requirement, with a recycling rate of 93.98%. The process is simple, the sodium hydroxide is reduced by 275.1 kg for treating 1 ton of lithium iron phosphate waste, the amount of waste water is reduced by 78%, and the relative production cost is reduced by 25%.

Comparative Example 1: Materials for implementing were the same as those in Embodiment 1. The method comprised the steps as follows. In 1, a slurry was prepared: 5 tons of waste lithium iron phosphate positive and negative electrode powder was added to water or a lithium-containing solution according to a mass ratio of 1/4 to prepare the slurry by a 20 m³ reaction kettle.

In 2, a PH of the material slurry was adjusted to be 1.0 with hydrochloric acid.

In 3, lithium was selectively extracted: 532 kg of solid sodium chlorate was added to the material slurry according to an amount of 0.35 times of ferrous iron to react at 80° C. for 60 minutes.

In 4, filter-pressing and washing were performed: filter-pressing and washing were performed by a plate-and-frame filter press, a filter cake was a lithium extraction residue, and a filtrate was a lithium-containing solution.

In 5, impurities were removed: a sodium hydroxide solution was added to adjust a PH value to be 9.0, the mixture was stirred for 30 minutes, filter-pressing and washing were performed, a filter cake was a copper-aluminum slag, and innocuous disposal was performed; and a filtrate and a washing liquid were controlled to be 18 m³, and entered the next working procedure.

In 6, lithium carbonate was precipitated: the filtrate was pumped to a lithium precipitation barrel, a saturated sodium carbonate solution was added to form a lithium carbonate precipitate, and a filtrate after filter-pressing returned to the slurry preparation procedure in the step S1); and a filter cake was a lithium carbonate product.

In 7, iron phosphate was dissolved: the lithium extraction residue in the step 4 was received by a 20 m³ reaction kettle, added with water to prepare a slurry with a mass ratio of about 1/4, and added with concentrated hydrochloric acid to adjust a PH to be 0.5, the pH value was maintained with hydrochloric acid at the same time, and the mixture was stirred for 3 hours.

In 8, filter-pressing and washing were performed: a filter cake was a decomposed residue, and innocuous disposal was performed; and a filtrate and a washing liquid were combined.

In 9, the iron phosphate was synthesized: iron and phosphorus contents of the filtrate and the washing liquid after filter-pressing in the step 8 were detected, trisodium phosphate or ferric chloride was added to ensure that a molar ratio of iron to phosphorus was 1/0.97-1.02, a PH was controlled to be 0.5 to react for 0.5 hours, and then the PH was controlled to be 1.5 with a sodium hydroxide solution to precipitate the iron phosphate.

In 10, filter-pressing and washing were performed: filter-pressing and washing were performed by a plate-and-frame filter press, and a filtrate and a washing liquid were combined to enter a wastewater treatment station; and a filter cake was crude iron phosphate, and entered the next working procedure.

In S11, reverse three-stage washing to remove impurities was performed: the crude iron phosphate filter cake was stirred and reversely washed for three times with a washing liquid with a PH value of 1.0 to wash away other metal salts in the crude iron phosphate, so as to obtain a pure iron phosphate filter cake, wherein the steps were as follows.

In (1), a washing liquid was prepared: 18 m³ of pure water was added to an acid adjusting barrel of 20 m³ of pure water, and added with guaranteed pure hydrochloric acid to prepare a liquid with a pH of 1.0 for later use.

In (2), first washing was performed: the crude iron phosphate filter cake was added to second washing water according to a mass ratio of 1/5, the mixture was stirred for 30 minutes, filter-pressing and washing with the second washing water were performed, and a filtrate and a washing liquid entered the wastewater treatment station; and a filter cake entered second washing.

In (3), second washing was performed: the crude iron phosphate filter cake was added to third washing water according to a mass ratio of 1/5, the mixture was stirred for 30 minutes, filter-pressing and washing with the third washing water were performed, and a filtrate and a washing liquid were used for the first washing; and a filter cake entered third washing.

In (4), third washing was performed: the crude iron phosphate filter cake was added to new washing water according to a mass ratio of 1/5, the mixture was stirred for 30 minutes, filter-pressing and washing with the new washing water were performed, and a filtrate and a washing liquid were used for the second washing; and a filter cake was used as pure iron phosphate, and a drying procedure was entered after qualified detection.

In 12, drying and crushing were performed: the pure iron phosphate filter cake was dried by a microwave drying oven at a temperature of 90° C. until a water content was 0, 1%, and the dried filter cake was crushed to be within 5 μm by a jet mill to obtain the iron phosphate product.

Detection data were as follows.

| Item | Condition | Detection result (g/L) | | | | | | | | | |
|---|---|---|---|---|---|---|---|---|---|---|---|
| | | Li | Fe | P | Al | Cu | Co | Ni | Mn | Ca | Cd |
| Comparative Example 1 | Solid-liquid ratio: 1/4 PH of slurry: 1.0 Adding amount of sodium chlorate: 352 kg Number of times of thickening: 0 | 8.54 Dissolution rate: 99.1% | 24.4 Dissolution rate: 35.12% | 15.36 Dissolution rate: 40.07% | 1.426 Dissolution rate: 41.4% | 1.19 Dissolution rate: 41.2% | 0.025 | 0.047 | 0.13 | 0.0010 | 0.0013 |
| | Dissolving liquid of residue (g/L) Solid-liquid ratio: 1/4 PH of slurry: 0.5 | 0.15 Dissolution rate of lithium: 99.9% | 49.88 Dissolution rate of iron: 98.5% | 21.19 Dissolution rate of phosphorus: 96.62% | 2.10 Dissolution rate of aluminum: 99.10% | 1.78 Dissolution rate of copper: 98.72% | / | / | / | / | / |
| | Dissolved residue Natural basis (%) | / | 0.15 | 0.04 | / | / | / | / | / | / | / |
| | Crude iron phosphate Natural basis (%) | 0.0001 | 21.18% | 11.34 | 0.18 | 0.15 | 1.33 | 0.0007 | 0.0010 | 0.014 | 0.0008 |
| | Total washing liquid in washing for three times PH: 1.0 (g/L) | / | 15.96 | 4.93 | 0.42 | 0.35 | 3.13 | / | / | / | / |
| | Iron phosphate product Dry basis (%) | / | 29.15 Recycling rate of iron phosphate: 68.00% | 15.62 Recycling rate of iron phosphate: 68.00% | 0.0005 | 0.0005 | 0.0025 | 0.0005 | 0.0013 | 0.0014 | 0.0005 |

In Comparative Example 1, the PH value of the selective lithium extraction is 1.0, and the lithium containing solution contains 24.4 g/L iron and 15.36 g/L phosphorus, resulting in a great loss of phosphorus and iron. When the impurities of the crude iron phosphate are washed away, the PH of the washing liquid is 1.0, and the washing liquid contains 15.96 g/L iron and 4.93 g/L phosphorus, resulting in a great loss of phosphorus and iron, so that the recycling rate of the iron phosphate is only 68.0%.

Comparative Example 2: Materials for implementing were the same as those in Embodiment 1. The method comprised the steps as follows. In 1, a slurry was prepared: 5 tons of waste lithium iron phosphate positive and negative electrode powder was added to water or a lithium-containing solution according to a mass ratio of 1/4 to prepare the slurry by a 20 m³ reaction kettle.

In 2, a PH of the material slurry was adjusted to be 2.0 with hydrochloric acid.

In 3, lithium was selectively extracted: 532 kg of solid sodium chlorate was added to the material slurry according to an amount of 0.35 times of ferrous iron to react at 80° C. for 60 minutes.

In 4, filter-pressing and washing were performed, and thickening was performed twice: filter-pressing and washing were performed by a plate-and-frame filter press, a filter cake was allowed to extract a lithium residue, a filtrate was a lithium-containing solution, the slurry preparation procedure in the step S1) was returned for slurry preparation, and the selective lithium extraction was repeated twice to increase a lithium content of the lithium-containing solution.

In 5, impurities were removed: a sodium hydroxide solution was added to the thickened lithium-containing solution to adjust a PH value to be 9.0, the mixture was stirred for 30 minutes, filter-pressing and washing were performed, a filter cake was a copper-aluminum slag, and innocuous disposal was performed; and a filtrate and a washing liquid were controlled to be 18 m³, and entered the next working procedure.

In 6, lithium carbonate was precipitated: the filtrate was pumped to a lithium precipitation barrel, a saturated sodium carbonate solution was added to form a lithium carbonate precipitate, and a filtrate after filter-pressing returned to the slurry preparation procedure in the step S1); and a filter cake was a lithium carbonate product.

In 7, iron phosphate was dissolved: the lithium extraction residue in the step 4 was received by a 20 m³ reaction kettle, added with water to prepare a slurry with a mass ratio of about 1/4, and added with concentrated hydrochloric acid to adjust a PH to be 0.1, the pH value was maintained with hydrochloric acid at the same time, and the mixture was stirred for 3 hours.

In 8, filter-pressing and washing were performed: a filter cake was a decomposed residue, and innocuous disposal was performed; and a filtrate and a washing liquid were combined.

In 9, the iron phosphate was synthesized: iron and phosphorus contents of the filtrate and the washing liquid after filter-pressing in the step 8 were detected, trisodium phosphate or ferric chloride was added to ensure that a molar ratio of iron to phosphorus was 1/0.97-1.02, a PH was controlled to be 0.5 to react for 2.0 hours, and then the PH was controlled to be 1.5 with a sodium hydroxide solution to precipitate the iron phosphate.

In 10, filter-pressing and washing were performed: filter-pressing and washing were performed by a plate-and-frame filter press, and a filtrate and a washing liquid were combined to enter a wastewater treatment station; and a filter cake was crude iron phosphate, and entered the next working procedure.

In S11), reverse three-stage washing to remove impurities was performed: the crude iron phosphate filter cake was stirred and reversely washed for three times with a washing liquid with a PH value of 2.0 to wash away other metal salts in the crude iron phosphate, so as to obtain a pure iron phosphate filter cake, wherein the steps were as follows. In (1), a washing liquid was prepared: 18 m³ of pure water was added to an acid adjusting barrel of 20 m³ of pure water, and added with guaranteed pure hydrochloric acid to prepare a liquid with a pH of 2.0 for later use.

In (2), first washing was performed: the crude iron phosphate filter cake was added to second washing water according to a mass ratio of 1/5, the mixture was stirred for 30 minutes, filter-pressing and washing with the second washing water were performed, and a filtrate and a washing liquid entered the wastewater treatment station; and a filter cake entered second washing.

In (3), second washing was performed: the crude iron phosphate filter cake was added to third washing water according to a mass ratio of 1/5, the mixture was stirred for 30 minutes, filter-pressing and washing with the third washing water were performed, and a filtrate and a washing liquid were used for the first washing; and a filter cake entered third washing.

In (4), third washing was performed: the crude iron phosphate filter cake was added to new washing water according to a mass ratio of 1/5, the mixture was stirred for 30 minutes, filter-pressing and washing with the new washing water were performed, and a filtrate and a washing liquid were used for the second washing; and a filter cake was used as pure iron phosphate.

In 12, drying and crushing were performed: the pure iron phosphate filter cake was dried by a microwave drying oven at a temperature of 90° C. until a water content was 0, 1%, and the dried filter cake was crushed to be within 5 μm by a jet mill to obtain the iron phosphate product.

Detection data were as follows.

| Item | Condition | Detection result (g/L) | | | | | | | | | |
|------|-----------|------|------|------|------|------|------|------|------|------|------|
| | | Li | Fe | P | Al | Cu | Co | Ni | Mn | Ca | Cd |
| Comparative Example 2 | Solid-liquid ratio: 1/4 PH of slurry: 2.0 Adding amount of sodium chlorate: 352 kg each time Number of times of thickening: 2 | 23.0 Dissolution rate: 90% | 0.62 Dissolution rate: 0.3% | 0.35 Dissolution rate: 0.3% | 0.71 Dissolution rate: 24.5% | 0.69 Dissolution rate: 24.3% | 0.041 | 0.074 | 0.21 | 0.0019 | 0.0021 |

-continued

| Item | Condition | Detection result (g/L) | | | | | | | | | |
|------|-----------|----|----|---|----|----|----|----|----|----|----|
| | | Li | Fe | P | Al | Cu | Co | Ni | Mn | Ca | Cd |
| | Dissolving liquid of residue (g/L) Solid-liquid ratio: 1/4 PH of slurry: 0.1 | 2.18 Dissolution rate of lithium: 99.9% | 50.59 Dissolution rate of iron: 99.9% | 21.91 Dissolution rate of phosphorus: 99.9% | 2.10 Dissolution rate of aluminum: 99.9% | 1.80 Dissolution rate of copper: 99.9% | / | / | / | / | / |
| | Dissolved residue Natural basis (%) | / | 0.1 | 0.1 | / | / | / | / | / | / | / |
| | Crude iron phosphate Natural basis filter cake (%) | 0.0001 | 20.50 | 10.96 | 0.16 | 0.14 | 1.27 | 0.0007 | 0.0010 | 0.014 | 0.0008 |
| | Total washing liquid in washing for three times PH: 2.0 (g/L) | / | 1.12 | 0.41 | 0.22 | 0.11 | 3.51 | / | / | / | / |
| | Iron phosphate product Dry basis (%) | / | 29.15 Recycling rate of iron phosphate: 98.1% | 15.62 Recycling rate of iron phosphate: 98.1% | 0.017 (Exceed standard) | 0.051 (Exceed standard) | 0.0020 | 0.032 | 0.047 | 0.041 | 0.047 |

In Comparative Example 2, the PH value of the selective lithium extraction is 2.0, the lithium-containing solution contains 23.0 g/L lithium, and the dissolution rate of the lithium is only 90%, resulting in a great loss of lithium. When the impurities of the crude iron phosphate are washed away, the PH of the washing liquid is 2.0, and the iron phosphate product contains 0.017% aluminum and 0.051% copper, so that the product does not meet a battery-grade requirement.

Comparative Example 3: Materials for implementing were the same as those in Embodiment 1. The method comprised the steps as follows. In 1, a slurry was prepared: 5 tons of waste lithium iron phosphate positive and negative electrode powder was added to water or a lithium-containing solution according to a mass ratio of 1/4 to prepare the slurry by a 20 m³ reaction kettle.

In 2, a PH of the material slurry was adjusted to be 2.5 with hydrochloric acid.

In 3, lithium was selectively extracted: 532 kg of solid sodium chlorate was added to the material slurry according to an amount of 0.35 times of ferrous iron to react at 80° C. for 60 minutes.

In 4, filter-pressing and washing were performed, and thickening was performed twice: filter-pressing and washing were performed by a plate-and-frame filter press, a filter cake was allowed to extract a lithium residue, a filtrate was a lithium-containing solution, the slurry preparation procedure in the step S1) was returned for slurry preparation, and the selective lithium extraction was repeated twice to increase a lithium content of the lithium-containing solution.

In 5, impurities were removed: a sodium hydroxide solution was added to the thickened lithium-containing solution to adjust a PH value to be 9.0, the mixture was stirred for 30 minutes, filter-pressing and washing were performed, a filter cake was a copper-aluminum slag, and innocuous disposal was performed; and a filtrate and a washing liquid were controlled to be 18 m³, and entered the next working procedure.

In 6, lithium carbonate was precipitated: the filtrate was pumped to a lithium precipitation barrel, a saturated sodium carbonate solution was added to form a lithium carbonate precipitate, and a filtrate after filter-pressing returned to the slurry preparation procedure in the step S1); and a filter cake was a lithium carbonate product.

In 7, iron phosphate was dissolved: the lithium extraction residue in the step 4 was received by a 20 m³ reaction kettle, added with water to prepare a slurry with a mass ratio of about 1/4, and added with concentrated hydrochloric acid to adjust a PH to be 0.5, the pH value was maintained with hydrochloric acid at the same time, and the mixture was stirred for 3 hours.

In 8, filter-pressing and washing were performed: a filter cake was a decomposed residue, and innocuous disposal was performed; and a filtrate and a washing liquid were combined.

In 9, the iron phosphate was synthesized: iron and phosphorus contents of the filtrate and the washing liquid after filter-pressing in the step 8 were detected, trisodium phosphate or ferric chloride was added to ensure that a molar ratio of iron to phosphorus was 1/0.97-1.02, a PH was controlled to be 0.5 to react for 1.5 hours, and then the PH was controlled to be 1.5 with a sodium hydroxide solution to precipitate the iron phosphate.

In 10, filter-pressing and washing were performed: filter-pressing and washing were performed by a plate-and-frame filter press, and a filtrate and a washing liquid were combined to enter a wastewater treatment station; and a filter cake was crude iron phosphate, and entered the next working procedure.

In S11), reverse three-stage washing to remove impurities was performed: the crude iron phosphate filter cake was stirred and reversely washed for three times with a washing liquid with a PH value of 2.5 to wash away other metal salts in the crude iron phosphate, so as to obtain a pure iron phosphate filter cake, wherein the steps were as follows. In (1), a washing liquid was prepared: 18 m³ of pure water was added to an acid adjusting barrel of 20 m³ of pure water, and added with guaranteed pure hydrochloric acid to prepare a liquid with a pH of 2.5 for later use.

In (2), first washing was performed: the crude iron phosphate filter cake was added to second washing water according to a mass ratio of 1/5, the mixture was stirred for 30 minutes, filter-pressing and washing with the second washing water were performed, and a filtrate and a washing liquid entered the wastewater treatment station; and a filter cake entered second washing.

In (3), second washing was performed: the crude iron phosphate filter cake was added to third washing water according to a mass ratio of 1/5, the mixture was stirred for 30 minutes, filter-pressing and washing with the third washing water were performed, and a filtrate and a washing liquid were used for the first washing; and a filter cake entered third washing.

In (4), third washing was performed: the crude iron phosphate filter cake was added to new washing water according to a mass ratio of 1/5, the mixture was stirred for 30 minutes, filter-pressing and washing with the new washing water were performed, and a filtrate and a washing liquid were used for the second washing; and a filter cake was used as pure iron phosphate, and a drying procedure was entered after qualified detection.

In 12, drying and crushing were performed: the pure iron phosphate filter cake was dried by a microwave drying oven at a temperature of 90° C. until a water content was 0, 1%, and the dried filter cake was crushed to be within 5 μm by a jet mill to obtain the iron phosphate product.

Detection data were as follows.

ing from the method of the present invention should also be regarded as falling within the scope of protection of the present invention. Those skilled in the art may make some alterations, modifications and equivalent changes by using the above-mentioned technical contents without departing from the spirit and scope of the present invention, which are all equivalent embodiments of the present invention. Meanwhile, any alterations, modifications and evolutions of equivalent changes made to the above embodiments according to the essential technology of the present invention still belong to the scope of protection of the present invention.

INDUSTRIAL APPLICABILITY

The technology of the present invention has been put into industrial production and application. The dissolution rate of lithium reaches 99.9%, the dissolution rate of iron phosphorus is equal to or greater than 96.62%, the dissolution rate of phosphorus is equal to or greater than 96.54%, the dissolution rate of aluminum is equal to or greater than 92.17%, and the dissolution rate of copper is equal to or greater than 91.82%, so that the iron phosphate product meets the battery-grade quality requirement, with the recycling rate equal to or greater than 93.93%. The process is simple, the

| Item | Condition | Detection result (g/L) | | | | | | | | | |
| --- | --- | --- | --- | --- | --- | --- | --- | --- | --- | --- | --- |
| | | Li | Fe | P | Al | Cu | Co | Ni | Mn | Ca | Cd |
| Comparative Example 3 | Solid-liquid ratio: 1/4 PH of slurry: 2.5 Adding amount of sodium chlorate: 352 kg each time Number of times of thickening: 2 | 18.96 Dissolution rate: 74.2% | 0.21 Dissolution rate: 0.1% | 0.12 Dissolution rate: 0.1% | 0.36 Dissolution rate: 10.4% | 0.32 Dissolution rate: 11.1% | 0.038 | 0.064 | 0.18 | 0.0015 | 0.0020 |
| | Dissolving liquid of residue (g/L) Solid-liquid ratio: 1/4 PH of slurry: 0.5 Dissolution rate of iron phosphate: | 4.32 Dissolution rate of lithium: 98.9% | 49.7 Dissolution rate of iron: 98.9% | 20.78 Dissolution rate of phosphorus: 97.8% | 1.89 Dissolution rate of aluminum: 98.4% | 1.79 Dissolution rate of copper: 97.2% | / | / | / | / | / |
| | Dissolved residue Natural basis (%) | / | 0.18 | 0.21 | / | / | / | / | / | / | / |
| | Crude iron phosphate Natural basis (%) | 0.0001 | 20.50 | 10.96 | 0.16 | 0.14 | 1.27 | 0.0007 | 0.0010 | 0.014 | 0.0008 |
| | Washing liquid PH: 2.5 (g/L) | / | 1.12 | 0.41 | 0.22 | 0.11 | 3.51 | / | / | / | / |
| | Iron phosphate product Dry basis (%) | / | 29.15 Recycling rate of iron phosphate: 98.1% | 15.62 Recycling rate of iron phosphate: 98.1% | 0.014 (Exceed standard) | 0.041 (Exceed standard) | 0.0020 | 0.032 | 0.047 | 0.041 | 0.047 |

In Comparative Example 3, the PH value of the selective lithium extraction is 2.5, the lithium-containing solution contains 18.96 g/L lithium, and the dissolution rate of the lithium is only 74.2%, resulting in a great loss of lithium. When the impurities of the crude iron phosphate are washed away, the PH of the washing liquid is 2.5, and the iron phosphate product contains 0.014% aluminum and 0.041% copper, so that the product does not meet a battery-grade requirement.

The above are only the illustrative embodiments of the present invention, and are not intended to limit the present invention in form and in essence. It should be pointed out that, for those of ordinary skills in the technical field, several improvements and supplementations made without departsodium hydroxide is reduced by more than 273.8 kg for per ton of lithium iron phosphate waste, the amount of waste water is reduced by more than 75%, and the relative production cost is reduced by at least 25%.

The invention claimed is:

1. A selective lithium extraction method for a waste lithium iron phosphate battery, comprising: first adding waste lithium iron phosphate positive and negative electrode powder to water or a lithium-containing solution to prepare a slurry and then adjusting a pH of the slurry to be 1.5 to 2.0 with hydrochloric acid, then adding solid sodium chlorate to the slurry in an amount of 0.35 to 0.4 times the mass of ferrous iron, selectively dissolving lithium in the solution, leaving iron phosphate in a residue, and then performing solid-liquid separation to obtain the lithium-containing solution and an iron-phosphate-containing lithium extraction residue.

2. The selective lithium extraction method for the waste lithium iron phosphate battery according to claim 1, wherein after adding the solid sodium chlorate to the slurry, all ferrous iron ions of lithium iron phosphate in the slurry are oxidized into ferric iron ions to convert the lithium iron phosphate into the iron phosphate, lithium ions are freed, solid-liquid separation is performed, then a filtrate is a lithium-containing solution, when a lithium content of the lithium-containing solution is less than 15 g/L, the slurry preparation procedure is returned to prepare the slurry, so as to increase the lithium content of the lithium-containing solution, when the lithium content of the lithium-containing solution is greater than 15 g/L, a sodium hydroxide solution is added to adjust a pH value to be 8.5 to 9.5, so that copper, aluminum and other metal ions in the solution form a hydroxide precipitate, and a filtrate is a pure lithium-containing solution.

3. The selective lithium extraction method for the waste lithium iron phosphate battery according to claim 1, wherein the waste lithium iron phosphate positive and negative electrode powder is added to the water or the lithium-containing solution according to a mass ratio of 1/3-5 to prepare the slurry.

* * * * *